United States Patent
Bielenberg et al.

(10) Patent No.: US 8,739,962 B2
(45) Date of Patent: Jun. 3, 2014

(54) ACTIVE SOLIDS SUPPLY SYSTEM AND METHOD FOR SUPPLYING SOLIDS

(75) Inventors: James R. Bielenberg, Easton, PA (US); Michael Raterman, Doylestown, PA (US); Rathna P. Davuluri, Fairfax, VA (US); John W. Fulton, Annandale, VA (US); Steven W. Meier, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 625 days.

(21) Appl. No.: 12/962,346

(22) Filed: Dec. 7, 2010

(65) Prior Publication Data

US 2011/0139583 A1    Jun. 16, 2011

Related U.S. Application Data

(60) Provisional application No. 61/284,234, filed on Dec. 15, 2009.

(51) Int. Cl.
    *B65G 15/14* (2006.01)

(52) U.S. Cl.
    CPC ..................... *B65G 15/14* (2013.01)
    USPC ........ 198/604; 198/624; 198/626.1; 241/200; 241/227; 100/90

(58) Field of Classification Search
    USPC .............. 198/604, 624, 62.1; 241/198.1, 200, 241/220, 221, 227; 100/90
    See application file for complete search history.

(56) References Cited

U.S. PATENT DOCUMENTS

| | | | | |
|---|---|---|---|---|
| 1,997,611 | A * | 4/1935 | Thompson | 100/154 |
| 2,276,362 | A | 3/1942 | Wolf | |
| 2,415,355 | A * | 2/1947 | Kaufmann et al. | 100/152 |
| 2,867,843 | A * | 1/1959 | Browne et al. | 425/222 |
| 3,106,152 | A * | 10/1963 | Coffelt | 100/118 |
| 3,114,930 | A | 12/1963 | Oldham et al. | |
| 3,738,785 | A * | 6/1973 | Reinhardt et al. | 425/85 |
| 4,111,665 | A * | 9/1978 | Pasternak et al. | 48/77 |
| 4,137,053 | A | 1/1979 | Mitchell et al. | |
| 4,159,886 | A * | 7/1979 | Sage | 414/292 |
| 4,807,819 | A | 2/1989 | Krer et al. | |
| 4,988,239 | A | 1/1991 | Firth | |
| 5,271,319 | A * | 12/1993 | Plagemann | 100/90 |

(Continued)

OTHER PUBLICATIONS

John C. Cunningham, A Thesis "Experimental Studies and Modeling of the Roller Compaction of Pharmaceutical Powders," submitted to the Faculty of Drexel University, Jul. 2005.

(Continued)

*Primary Examiner* — William R Harp
(74) *Attorney, Agent, or Firm* — Bruce M. Bordelon; Chad A. Guice (57) ABSTRACT

A solids supply systems having a solids deaeration zone and a solids pump zone, and to methods for supplying the solids e.g., pulverized dry coal, to an application, e.g., gasification process. The solids deaeration zone includes a roller system containing a plurality of porous roller assemblies, or a belt system containing a plurality of porous belt assemblies. The solids deaeration zone is operable to deaerate and convey the solids to the solids pump zone. In the solids deaeration zone, the solids become sufficiently compacted prior to and upon entry into the solids pump zone to be effectively conveyed through the solids pump zone.

25 Claims, 4 Drawing Sheets

(56) References Cited

U.S. PATENT DOCUMENTS

| | | | |
|---|---|---|---|
| 5,485,909 | A | 1/1996 | Hay |
| 5,497,873 | A | 3/1996 | Hay |
| 5,657,704 | A | 8/1997 | Schueler |
| 7,134,387 | B2 * | 11/2006 | Yotsumoto et al. ....... 100/155 R |
| 7,387,197 | B2 | 6/2008 | Sprouse et al. |
| 7,579,385 | B1 | 8/2009 | Yamakoshi et al. |
| 7,584,919 | B2 * | 9/2009 | Adler et al. .................. 241/235 |
| 2004/0152790 | A1 | 8/2004 | Cornaro et al. |
| 2006/0243583 | A1 | 11/2006 | Sprouse et al. |
| 2007/0289861 | A1 | 12/2007 | Barkdoll et al. |
| 2008/0060914 | A1 | 3/2008 | Sprouse et al. |
| 2008/0256861 | A1 | 10/2008 | Van den Berg et al. |

OTHER PUBLICATIONS

Adapted from a paper by Ronald W. Miller, "Using a vacuum-deaeration feed system to minimize powder leakage during roll compaction," Powder and Bulk Engineering, vol. 11, No. 2, Feb. 1997, pp. 71-74.

"Roller Compactors", Alexanderwerk AG, Kippdorfstrabe 6-24, 42857 Remscheid, Germany (no publication date can be determined by applicants).

Jerry R. Johanson, Brian D. Cox, "Fluid Entrainment in Roll Press Compaction," Proceedings of the 20th Biennial Conference of the Institute for Briquetting and Agglomeration, J.R. Johanson, Inc. San Luis Obispo, CA 93401, pp. 251-263 (Oct. 1987).

Ronald W. Miller, Paul J. Sheskey, "Roller Compaction Technology for the Pharmaceutical Industry," Encyclopedia of Pharmaceutical Technology, Third Edition, vol. 5, pp. 3159-3176 (2007).

J.R. Johanson, "Predicting Limiting Roll Speeds for Briquetting Presses," Proceedings, Institute for Briquetting and Agglomeration, vol. 13, pp. 89-99 (1973).

Roman T Dec, "Problems with Processing of Fine Powders in Roll Press," K.R. Komarek Briquetting Research, IBA Proceedings, vol. 24, 24th Biennial Conference (1995).

* cited by examiner

ACTIVE SOLIDS SUPPLY SYSTEM AND METHOD FOR SUPPLYING SOLIDS

CROSS REFERENCE TO RELATED APPLICATIONS

This application claims the benefit of U.S. Provisional Application No. 61/284,234 filed Dec. 15, 2009.

FIELD OF THE DISCLOSURE

This disclosure generally relates to solids supply systems having a solids deaeration zone and a solids pump zone, and to methods for supplying the solids e.g., pulverized dry coal, to an application, e.g., gasification process. The solids deaeration zone includes a roller system containing a plurality of porous roller assemblies, or a belt system containing a plurality of porous belt assemblies. The solids pump zone includes a solids pump, for example, a belt (tractor), a roller or a rotary pump.

DISCUSSION OF THE BACKGROUND ART

The coal gasification process involves turning coal or other carbon-containing solids into synthesis gas. While both dry coal and a water slurry can be used in the gasification process, dry coal pumping is more thermally efficient than current water slurry technology. A wide variety of equipment has been used for pumping particulate material. Such transport equipment includes conveyor belts, rotary valves, lock hoppers, screw-type feeders, and the like.

One of the devices currently being used to pump dry coal to a high pressure is the cycling lock hopper. While the thermal cold gas efficiency of cycling lock hopper fed gasifiers is higher than other currently available technology in the gasification field, the mechanical efficiency of the cycling lock hopper is relatively low. The capital costs and operating costs of cycling lock hoppers are also high due to the high pressure tanks, valves, and gas compressors required in the cycling lock hopper process.

The use of dry coal extrusion pumps has become more common in dry coal gasification. However, some of the problems associated with currently available dry coal extrusion pumps are internal shear failure zones and flow stagnation problems. The presence of failure zones can lead to a decreased mechanical efficiency in the pump, as they result in a loss of the ability to transmit forces from the mechanical drive into transport of the particulate material.

For example, in dry coal extrusion type pumps such as rotary disk type pumps, particulate material enters a transport duct between two drive disk walls and is driven by movement of the drive walls from an inlet toward an outlet. The movement of the drive walls compacts the particles such that the particles transmit stresses across contacts with each other and the particulate material engages the drive walls, resulting in a drive force being transferred from the drive walls to the particulate material. As the particulate material enters the transport duct, it should be sufficiently compacted or compressed prior to or upon entry into the pumping apparatus to cause the particles to transmit stresses across their contacts, resulting in the formation of, what is referred to herein as, a transient solid or bridge composed of compacted particulate material that allows the solids pump to develop head or pressure in the particulate material and effectively convey the particulate material through the solids pump to a region of higher pressure. Successive bridges should occur cumulatively within the transport duct as further particulate material enters the inlet.

Fine particulate and powdery materials, such as dry pulverized coal, are difficult to effectively convey through the pumping system. Fine particulate and powdery materials tend to be aerated or well mixed with air when transported loosely or when loosely dropped through the inlet. The aerated fine particulate and powdery material may not be compacted enough to form a stress transmitting bridge of contacting particles between the rotary disks of the pumping device. As a result, the frictional force acting on the material by the rotary disks is not enough to transfer drive force to the material. Consequently, the fine particulate and powdery material may slip between the rotary disks and may not be effectively conveyed through the pumping device. If too much external force is applied to attempt to compress or deaerate the powdery material, the material tends to overly consolidate, clogging the inlet or the transport channel.

Thus, there is a need in the industry for an effective particulate transporting system for efficiently transporting fine particulate materials, particularly pulverized coal, using dry solids pumps that require particle bridging that allows the pumps to develop head or pressure in the particulate material.

SUMMARY OF THE DISCLOSURE

A solids supply system comprising: (i) a solids deaeration zone, and (ii) a solids pump zone, wherein the solids deaeration zone is in flow communication with the solids pump zone; the solids deaeration zone comprises: (a) a roller system comprising a plurality of porous roller assemblies, or (b) a belt system comprising a plurality of porous belt assemblies, operable to deaerate and convey the solids to the solids pump zone, wherein the solids become sufficiently compacted prior to and upon entry into the solids pump zone to be effectively conveyed through the solids pump zone; the solids deaeration zone is capable of being pressure regulated; and the solids pump zone comprises a solids pump operable to convey the solids to an application.

An alternative embodiment includes a solids supply system comprising: (i) a solids source zone, (ii) a solids deaeration zone, and (iii) a solids pump zone, wherein the solids source zone is in flow communication with the solids deaeration zone, and the solids deaeration zone is in flow communication with the solids pump zone; the solids source zone comprises at least one storage vessel operable to convey the solids by gravity to the solids deaeration zone; the solids deaeration zone comprises: (a) a roller system comprising a plurality of porous roller assemblies, or (b) a belt system comprising a plurality of porous belt assemblies, operable to deaerate and convey the solids to the solids pump zone, wherein the solids become sufficiently compacted prior to and upon entry into the solids pump zone to be effectively conveyed through the solids pump zone; the solids deaeration zone is capable of being pressure regulated; and the solids pump zone comprises a solids pump operable to convey the solids to an application.

This disclosure further relates in part to a method for transporting solids comprising: (i) providing a solids deaeration zone and a solids pump zone, wherein the solids deaeration zone is in flow communication with the solids pump zone; the solids deaeration zone comprises: (a) a roller system comprising a plurality of porous roller assemblies, or (b) a belt system comprising a plurality of porous belt assemblies, operable to deaerate and convey the solids to the solids pump zone; the solids deaeration zone is capable of being pressure regulated; and the solids pump zone comprises a solids pump operable to transport the solids; (ii) deaerating the solids in the solids deaeration zone, wherein the solids become sufficiently compacted prior to and upon entry into the solids pump zone to be effectively conveyed through the solids pump zone; and (iii) pumping the solids in the solids pump zone to an application.

This disclosure yet further relates in part to a method for transporting solids comprising: (i) providing a solids source zone, a solids deaeration zone and a solids pump zone, wherein the solids source zone is in flow communication with the solids deaeration zone, and the solids deaeration zone is in flow communication with the solids pump zone; the solids source zone comprises at least one storage vessel operable to convey the solids by gravity to the solids deaeration zone; the solids deaeration zone comprises: (a) a roller system comprising a plurality of porous roller assemblies, or (b) a belt system comprising a plurality of porous belt assemblies, operable to deaerate and convey the solids to the solids pump zone; the solids deaeration zone is capable of being pressure regulated; and the solids pump zone comprises a solids pump operable to transport the solids; (ii) deaerating the solids in the solids deaeration zone, wherein the solids become sufficiently compacted prior to and upon entry into the solids pump zone to be effectively conveyed through the solids pump zone; and (iii) pumping the solids in the solids pump zone to an application.

Further objects, features and advantages of the present disclosure will be understood by reference to the following drawings and detailed description.

DETAILED DESCRIPTION OF THE PREFERRED EMBODIMENTS

In accordance with this disclosure, a solids supply system is provided that includes a solids source zone, a solids deaeration zone and a solids pump zone. The solids supply system allows for conveying the solids in a dense phase flow. The solids deaeration zone allows the solids material to deaerate just prior to entering the solids pump zone, e.g., a variable speed, high pressure solids pump, and allows any entrained gas to be vented via an external conduit. The deaeration zone is located just ahead of the solids pump zone, e.g., the solids pump inlet. The solids pump zone includes, for example, a variable speed, high pressure solids pump having a pump inlet and a pump outlet, the pump inlet connected to the solids deaeration zone. The solids pump outlet can be connected to an application such as a gasification process, or to a dispenser vessel for dispensing the solids to an application. The dispenser vessel can be maintained at a higher pressure than the solids source zone.

As a volume of particulate material moves down through the solids deaeration zone with the aid of the plurality of porous roller assemblies or the plurality of porous belt assemblies, the particulate material gradually deaerates. As a result, the particulate material achieves a certain degree of compaction adjacent to an inlet port to the solids pump zone and forms relatively strong stress transmitting particle contact bridges between the solids pump zone components adjacent the inlet port. As a consequence, the particulate material is effectively conveyed into the transport channel and driven by the motion of the solids pump without substantial slipping between the particulate material and the internal surfaces of the solids pump. The particulate material moving through the solids deaeration zone can be deaerated to very low levels, well below the fluidization threshold.

This disclosure includes a solids supply system in which solids, such as pulverized coal, are provided to and stored at atmospheric pressure in a reservoir, from where the solids are discharged in dense phase flow and conveyed to an application through a solids pump, e.g., a variable speed high pressure solids pump. A solids deaeration zone is provided just upstream of the solids pump zone to maintain proper inlet conditions so that the pump will operate properly. The high pressure solids pump may be connected to a gasification process or other application which requires a supply of solids, such as pulverized coal, through a dense phase discharge line. The solids pump outlet can also be connected to a dispenser vessel for dispensing the solids to an application. In some systems the dense phase discharge from the solids pump to an application may be diluted with the addition of a fluidizing gas for improved flow characteristics.

Figure 1:
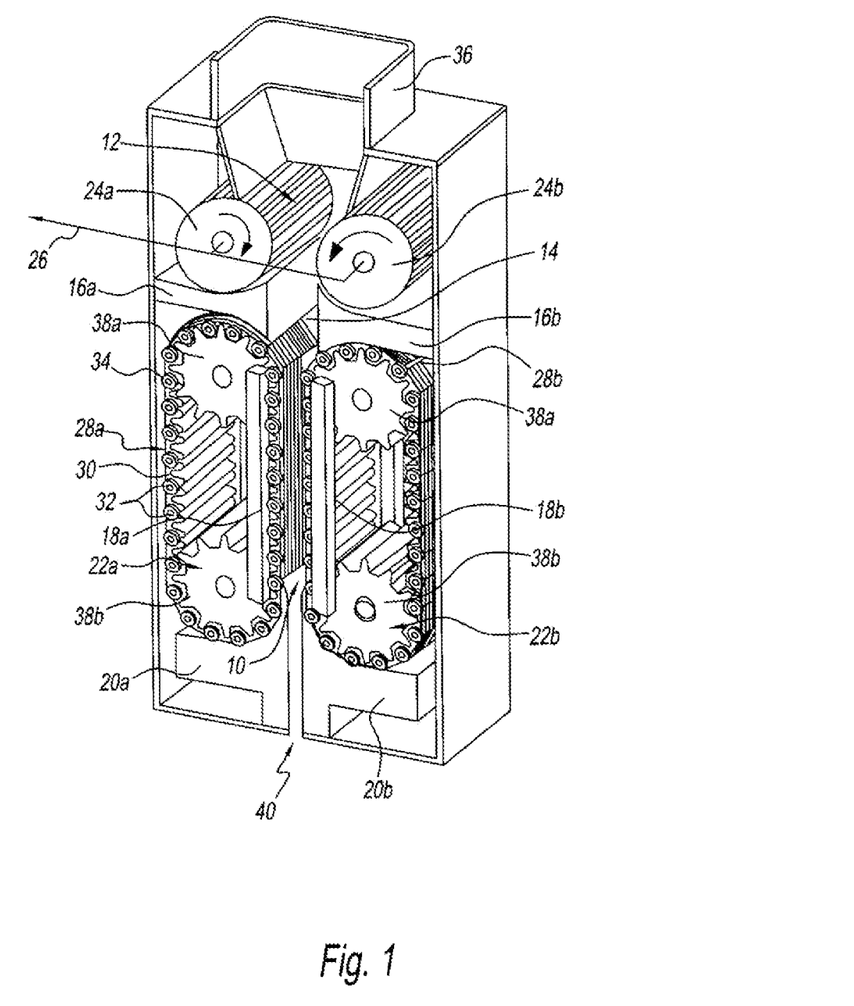
FIG. 1 is a perspective view of a solids supply system including a solids deaeration zone and a solids pump zone. The solids deaeration zone includes a roller system containing two porous roller assemblies, and the solids pump zone includes a belt (tractor) pump.

FIG. 1 shows a perspective view of a solids supply system including a solids deaeration zone and a solids pump zone for transporting pulverized dry coal. The system has increased efficiency by eliminating shear failure zones and flow stagnation zones. Flow stagnation zones occur where pulverized dry coal is driven into walls at substantially right angles or impinged by other pulverized dry coal moving in the opposite direction. By substantially reducing or eliminating shear failure zones and flow stagnation zones, the mechanical efficiency of the system can approach approximately 80%. In addition, the system is capable of pumping pulverized dry coal into gas pressure tanks with internal pressures of over 1200 pounds per square inch absolute. In a preferred embodiment, the solids pump zone is comprised of an inlet and an outlet and the differential pressure between the solids pump zone outlet and solids pump zone inlet is from 200 to 2,000 psig. More preferably, the solids pump zone is comprised of an inlet and an outlet and the differential pressure between the solids pump zone outlet and solids pump zone inlet is from 500 to 1,500 psig. It should be noted that although the system is discussed as transporting pulverized dry coal, the system may transport any dry particulate material and may be used in various industries, including, but not limited to the following markets: petrochemical, electrical power, food, and agricultural.

The solids supply system depicted in FIG. 1 generally includes a solids deaeration zone and a solids pump zone. The solids deaeration zone generally includes inlet duct 36, and inlet duct discharge area 12 between porous deaeration compaction rollers 24a and 24b. Precompacted solids guides and roller scrappers 16a and 16b are positioned below the porous deaeration compaction rollers 24a and 24b. The porous deaeration compaction rollers 24a and 24b have a vacuum connection 26 for maintaining a negative pressure gradient across the rollers in the radial outward direction across the compaction rollers. Pulverized dry coal is introduced into the solids deaeration zone at inlet duct 36, and passed into inlet duct discharge area 12. The porous deaeration compaction rollers 24a and 24b operate in at least a partial vacuum to deaerate and convey the solids through the solids deaeration zone into the solids pump zone.

It should be noted herein the that the terms "vacuum", "vacuum pressure" or "negative pressure" as used herein are equivalents and unless otherwise specified, these terms mean a lower pressure in the first zone referenced with respect to the pressure to a second referenced zone. As such, these terms are not limited to a pressure that is lower than standard atmospheric pressure.

First scraper seal 16a and second scraper seal 16b are positioned proximate inlet duct discharge area 12 and inlet feed zone 14. The exterior surface of first scraper seal 16a is designed to make a small angle with respect to the tangent of porous deaeration compaction roller 24a at the horizontal midline of the roller intersecting the axis of rotation in order to scrape the pulverized dry coal stream off from moving porous deaeration compaction roller 24a. The angle prevents pulverized dry coal stagnation that may lead to low pump mechanical efficiencies. The vertical position of the scraper may be below the horizontal midline intersecting the axis of rotation of porous compaction roller 24a. In an exemplary embodiment, first scraper seal 16a makes a 15 degree angle with respect to the midline tangent of porous deaeration compaction roller 24a. First scraper 16a may be made of any suitable material, including, but not limited to, hardened tool steel.

Second scraper seal 16b is formed and functions in the same manner as first scraper seal 16a to prevent stagnation at porous deaeration compaction roller 24b.

A first roller drive assembly (not shown) is positioned proximate to porous deaeration compaction roller 24a and drives porous deaeration compaction roller 24a in a first direction. The first roller drive assembly includes the required rotary vacuum seals and drive mechanisms known in the art that allow the drive assembly to function. In an exemplary embodiment, the first roller drive assembly rotates porous deaeration compaction roller 24a at a rate that produces a tangential velocity at the surface of the roller that is between 80% and 120% of the linear velocity of the belts (ft/s). The first roller drive assembly preferably rotates porous deaeration compaction roller 24a at a rate that produces a tangential velocity at the surface of the roller that is 100% of the linear velocity of the belts (ft/s).

Likewise, a second roller drive assembly (not shown) for driving porous deaeration compaction roller 24b includes the required rotary vacuum seals and drive mechanisms known in the art that allow the drive assembly to function. The second roller drive assembly is formed and functions in the same manner as first roller drive assembly, except that the second roller drive assembly drives porous deaeration compaction roller 24b in a second direction so that the vertical components of the tangential velocities of the rollers are pointing in the same direction.

As the pulverized dry coal moves down through the solids deaeration zone, the particulate material deaerates and compacts to a degree. As a result, the pulverized dry coal achieves a certain degree of deaeration and compaction adjacent the inlet feed zone 14 of the solids pump zone and forms relatively strong stress transmitting particle contact bridges between the solids pump zone components adjacent the inlet feed zone 14. Accordingly, the suitably compacted pulverized dry coal is effectively gripped and moved between the solids pump zone components without substantial slippage between the pulverized dry coal and internal surfaces of the solids pump zone.

The solids pump zone includes passageway 10, pump high pressure discharge 40, first load beam 18a, second load beam 18b, first outlet scraper 20a, second outlet scraper 20b, first drive assembly 22a, and second drive assembly 22b. Pulverized dry coal is introduced into the solids pump at inlet feed zone 14, passed through passageway 10, and expelled from the pump at pump high pressure discharge outlet 40. Passageway 10 is defined by first belt assembly 28a and second belt assembly 28b, which are positioned substantially parallel and opposed to each other.

First belt assembly 28a is formed from belt links 30 connected to each other by link rotation axles 32 and track wheels 34. Link rotation axles 32 allow belt links 30 to form a flat surface as well as allow belt links 30 to bend around first drive assembly 22a. First belt assembly 28a defines an inner section in which a first drive assembly (not shown) is located. Track wheels 34 cover ends of link rotation axles 32 and function to transfer the mechanical compressive loads normal to belt links 30 into load beam 18a. First belt assembly 28a, together with second belt assembly 28b, transports the pulverized dry coal through passageway 10.

Second belt assembly 28b includes belt links 30, link rotation axles 32, track wheels 34, and a second inner section (not shown). Belt links 30, link rotation axles 32, track wheels 34, and the second inner section are connected and function in the same manner as belt links 30, link rotation axles 32, track wheels 34, and the first inner section of first belt assembly 28a.

First and second load beams 18a and 18b are positioned within first belt assembly 28a and second belt assembly 28b, respectively. First load beam 18a carries the mechanical load from first belt assembly 28a and maintains the section of first belt assembly 28a defining passageway 10 in a substantially linear form. The pulverized dry coal being transported through passageway 10 creates solid, stresses on first belt assembly 28a in both a compressive outward direction away from passageway 10 as well as in a shearing upward direction toward inlet 14.

Second load beam 18b is formed and functions in the same manner as first load beam 18a to maintain second belt assembly 28b in a substantially linear form at passageway 10 and to transfer outward compressive and upward shearing loads from belt links 30 to second load beam 18b, drive sprockets 38a and 38b, and second drive assembly 22b.

First scraper seal 20a and second scraper seal 20b are positioned proximate passageway 10 and outlet 40. First belt assembly 28a and first scraper seal 20a form a seal between the pump and the outside atmosphere. Thus, the few pulverized dry coal particles that become caught between first belt assembly 28a and first scraper seal 20a become a moving pressure seal for first belt assembly 28a. The exterior surface of first scraper seal 20a is designed to make a small angle with the straight section of first belt assembly 28a in order to scrape the pulverized dry coal stream off from moving first belt assembly 28a. The angle prevents pulverized dry coal stagnation that may lead to low pump mechanical efficiencies. In an exemplary embodiment, first scraper seal 20a makes a 15 degree angle with the straight section of first belt assembly 28*a*. First scraper seal 20*a* may be made of any suitable material, including, but not limited to, hardened tool steel.

Second scraper seal 20*b* is formed and functions in the same manner as first scraper seal 20*a* to prevent stagnation at second belt assembly 28*b*.

First drive assembly 22*a* is positioned within the first interior section of first belt assembly 28*a* and drives first belt assembly 28*a* in a first direction. First drive assembly 22*a* includes at least two drive sprockets 38*a* and 38*b* positioned at opposing ends of first belt assembly 28*a*. Each of drive sprockets 38*a* and 38*b* has a generally circular shaped base with a plurality of sprocket teeth protruding from the base. The sprockets interact with first belt assembly 28*a* and drives first belt assembly 28*a* around drive sprockets 38*a* and 38*b*. In an exemplary embodiment, first drive assembly 22*a* rotates first belt assembly 28*a* at a rate of between approximately 1 foot per second and approximately 5 feet per second (ft/s). The drive sprockets 38*a* and 38*b* include the required drive mechanisms known in the art that allow the drive assemblies to function.

Likewise, second drive assembly 22*b* includes at least two drive sprockets 38*a* and 38*b* positioned within the second interior section of second belt assembly 28*b* for driving second belt assembly 28*b*. Second drive assembly 22*b* is formed and functions in the same manner as first drive assembly 22*a*, except that second drive assembly 22*b* drives second belt assembly 28*b* in a second direction. The drive sprockets 38*a* and 38*b* include the required drive mechanisms known in the art that allow the drive assemblies to function.

Figure 2:
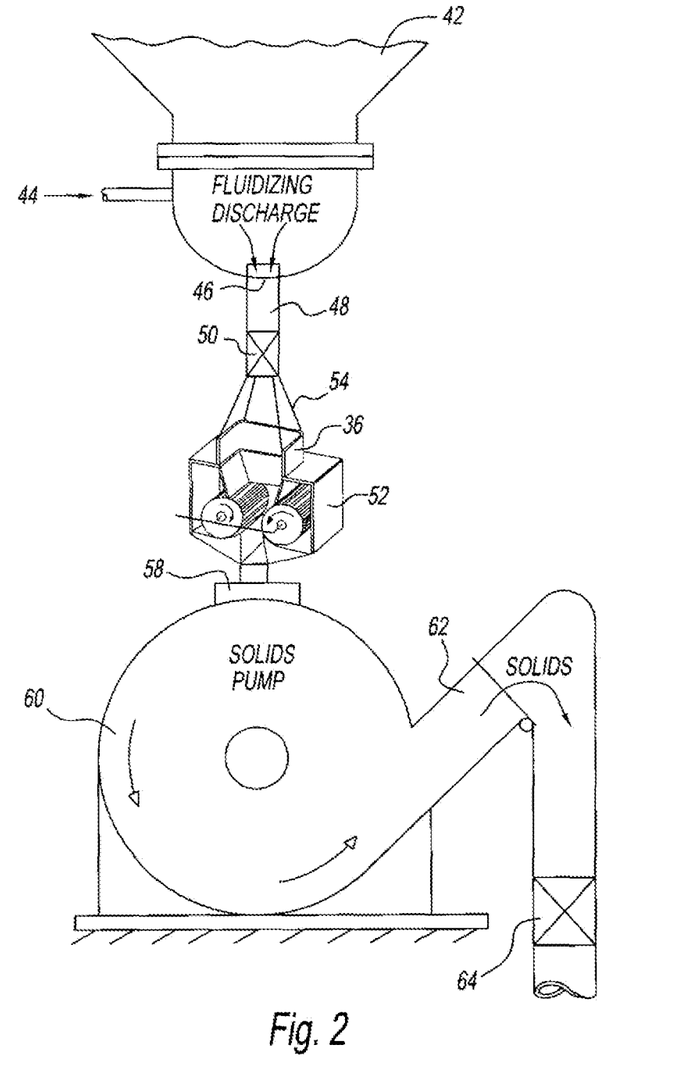
FIG. 2 is a perspective view of a solids supply system including a solids source zone, a solids deaeration zone and a solids pump zone. The solids deaeration zone is external to the solids pump zone. The solids deaeration zone includes a roller system containing two porous roller assemblies, and the solids pump zone includes a rotary pump.

FIG. 2 shows a perspective view of a solids supply system including a solids source zone, a solids deaeration zone and a solids pump zone for transporting pulverized dry coal. Like the system depicted in FIG. 1, this system has increased efficiency by eliminating shear failure zones and flow stagnation zones.

The solids supply system depicted in FIG. 2 is similar to the solids supply system depicted in FIG. 1 except for the addition of a solids source zone and the solids pump zone contains a rotary pump instead of a belt (tractor) pump. Also, the solids deaeration zone is external to the solids pump zone in FIG. 2. The solids supply system depicted in FIG. 2 includes a reservoir 42 which may be several atmospheres or atmospheric pressure, a fluidizing gas connection 44, a fluidizing discharge outlet 46, a dense phase discharge conduit 48, and a dense phase discharge outlet 54 connected to inlet duct 36 in the solids deaeration zone. An isolation valve 50 is preferably positioned between the fluidizing discharge outlet 46 and the dense phase discharge outlet 54 to assist in isolating parts of the system for cleaning and maintenance purposes, and/or for helping to regulate the solids flow out of the reservoir.

The solids supply system depicted in FIG. 2 includes a rotary solids pump 60, an inlet feed zone 58, and an outlet duct 62. An isolation valve 64 is preferably positioned after outlet duct 62 to assist in isolating parts of the system for cleaning and maintenance purposes, and/or for helping to regulate the solids flow out of the rotary solids pump.

As the pulverized dry coal moves down through the solids deaeration zone, the particulate material deaerates and compacts to a degree. As a result, the pulverized dry coal achieves a certain degree of deaeration and compaction adjacent the inlet feed zone 58 of the solids pump zone and forms relatively strong stress transmitting particle contact bridges between the solids pump zone components adjacent the inlet feed zone 58. Accordingly, the suitably compacted pulverized dry coal is effectively gripped and moved between the solids pump zone components without substantial slippage between the pulverized dry coal and internal surfaces of the solids pump zone. The solids deaeration zone 52 as shown in FIG. 2 is substantially the same as described above for FIG. 1.

Figure 3:
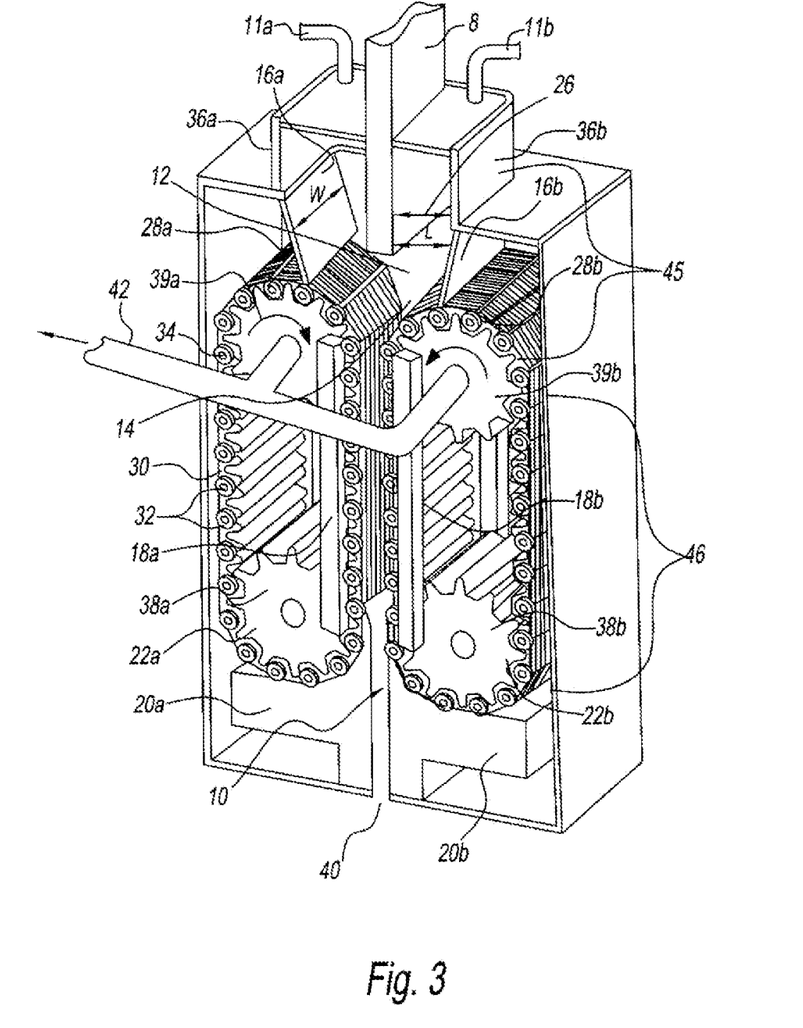
FIG. 3 is a perspective view of a solids supply system including an integrated solids deaeration zone and a solids pump zone. The solids deaeration zone is formed by two vacuum sprockets (upper) and includes a belt system containing two porous belt assemblies which also are included in the solids pump zone.

FIG. 3 shows a perspective view of a solids supply system including an integrated solids deaeration zone and solids pump zone for transporting pulverized dry coal. The system has increased efficiency by eliminating shear failure zones and flow stagnation zones. Shear failure zones interfere with the ability to transmit a driving stress across the particulate material. Flow stagnation zones occur where pulverized dry coal is driven into walls at substantially right angles or impinged by other pulverized dry coal moving in the opposite direction. By substantially reducing or eliminating shear failure zones and flow stagnation zones, the mechanical efficiency of the system can approach approximately 80%. In addition, the system is capable of pumping pulverized dry coal into gas pressure tanks with internal pressures of over 1200 pounds per square inch absolute. Although the system is discussed as transporting pulverized dry coal, the system may transport any dry particulate material and may be used in various industries, including, but not limited to the following markets: petrochemical, electrical power, food, and agricultural.

As used herein, "integrated" means features and/or components common to or shared between different zones that contribute to the overall operation of the solids supply system. For example, in FIG. 3, the first and second porous belt assemblies 28*a* and 28*b* and vacuum drive sprockets (porous) 39*a* and 39*b* function both in the solids deaeration zone and the solids pump zone. Thus, the solids deaeration zone 45 is integrated with the solids pump zone 46.

An alternate to the solids supply system depicted in FIG. 1 is shown in FIG. 3 which includes a vacuum assisted solids deaeration zone 45 integrated with a solids pump zone 46. The integration involves the first and second porous belt assemblies 28*a* and 28*b* and vacuum drive sprockets (porous) 39*a* and 39*b* functioning both in the solids deaeration zone and the solids pump zone. The vacuum assisted solids deaeration zone 45 generally includes inlet duct 8, inlet duct discharge area 12, opposed sloped walls 16*a* and 16*b*, opposed straight walls 36*a* and 36*b*, and deaeration plenum vents 11*a* and 11*b*. The deaeration plenum vents 11*a* and 11*b* are connected to an area of lower pressure than the pressure of the solids deaeration zone 45. Pulverized dry coal is introduced into the vacuum assisted solids deaeration zone 45 at inlet duct 8, and passed into inlet duct discharge area 12 which is integrated with solids pump zone 46. The sloped walls of the deaeration plenum 16*a* and 16*b* operate to contain and direct the solids through the vacuum assisted solids deaeration zone 45 into the solids pump zone 46.

The distance (L) between the outside wall of the inlet duct 8 and either the straight walls 36*a* or 36*b* or the sloped walls 16*a* or 16*b* at the deaeration surface 26 can range from about 0.2 times the radius of the porous belt at vacuum sprockets 39*a* and 39*b* to about 1.2 times the radius of the porous belt assembly at vacuum sprockets 39*a* and 39*b*, preferably from about 0.3 times the radius of the porous belt at vacuum sprockets 39*a* and 39*b* to about 1.0 times the radius of the porous belt at vacuum sprockets 39*a* and 39*b*, and more preferably from about 0.5 times the radius of the porous belt at vacuum sprockets 39*a* and 39*b* to about 0.9 times the radius of the porous belt at vacuum sprockets 39*a* and 39*b*. Preferably, the width (W) of the deaeration plenum sloped walls is the same width as porous belt assemblies 28*a* and 28*b*. The surface area should be sufficient for the solids to become compacted prior to and upon entry into the solids pump zone 46 and effectively conveyed through the solids pump zone 46.

As indicated above, the first and second porous belt assemblies 28a and 28b and vacuum drive sprockets (porous) 39a and 39b function both in the solids deaeration zone and the solids pump zone. As the pulverized dry coal moves down through the solids deaeration zone 45 and is transported by first and second porous belt assemblies 28a and 28b using vacuum drive sprockets (porous) 39a and 39b, the particulate material deaerates and compacts to a degree. As a result, the pulverized dry coal achieves a certain degree of deaeration and compaction adjacent the inlet feed zone 14 of the solids pump zone 46 and forms relatively strong stress transmitting particle contact bridges between the solids pump zone components adjacent the inlet feed zone 14. Accordingly, the suitably compacted pulverized dry coal is effectively gripped and moved between the solids pump zone components without substantial slippage between the pulverized dry coal and internal surfaces of the solids pump zone 46.

The solids pump zone 46 includes passageway 10, pump high pressure discharge 40, first load beam 18a, second load beam 18b, first outlet scraper 20a, second outlet scraper 20b, first drive assembly 22a, and second drive assembly 22b. Pulverized dry coal is introduced into the solids pump at inlet feed zone 14, passed through passageway 10, and expelled from the pump at pump high pressure discharge outlet 40. Passageway 10 is defined by first porous belt assembly 28a and second porous belt assembly 28b, which are positioned substantially parallel and opposed to each other.

First porous belt assembly 28a is formed from belt links 30 connected to each other by link rotation axles 32 and track wheels 34. Link rotation axles 32 allow belt links 30 to form a flat surface as well as allow belt links 30 to bend around first drive assembly 22a. First belt assembly 28a defines an inner section in which a first drive assembly (not shown) is located. Track wheels 34 cover ends of link rotation axles 32 and function to transfer the mechanical compressive loads normal to belt links 30 into load beam 18a. First belt assembly 28a, together with second porous belt assembly 28b, transports the pulverized dry coal through passageway 10.

Second porous belt assembly 28b includes belt links 30, link rotation axles 32, track wheels 34, and a second inner section (not shown). Belt links 30, link rotation axles 32, track wheels 34, and the second inner section are connected and function in the same manner as belt links 30, link rotation axles 32, track wheels 34, and the first inner section of first porous belt assembly 28a.

First and second load beams 18a and 18b are positioned within first porous belt assembly 28a and second porous belt assembly 28b, respectively. First load beam 18a carries the mechanical load from first porous belt assembly 28a and maintains the section of first porous belt assembly 28a defining passageway 10 in a substantially linear form. The pulverized dry coal being transported through passageway 10 creates solid stresses on first porous belt assembly 28a in both a compressive outward direction away from passageway 10 as well as in a shearing upward direction toward inlet 14.

Second load beam 18b is formed and functions in the same manner as first load beam 18a to maintain second porous belt assembly 28b in a substantially linear form at passageway 10 and to transfer outward compressive and upward shearing loads from belt links 30 to second load beam 18b, drive sprockets 38a and 38b, and second drive assembly 22b.

First scraper seal 20a and second scraper seal 20b are positioned proximate passageway 10 and outlet 40. First belt assembly 28a and first scraper seal 20a form a seal between the pump and the outside atmosphere. Thus, the few pulverized dry coal particles that become caught between first belt assembly 28a and first scraper seal 20a become a moving pressure seal for first belt assembly 28a. The exterior surface of first scraper seal 20a is designed to make a small angle with the straight section of first belt assembly 28a in order to scrape the pulverized dry coal stream off from moving first porous belt assembly 28a. The angle prevents pulverized dry coal stagnation that may lead to low pump mechanical efficiencies. In an exemplary embodiment, first scraper seal 20a makes a 15 degree angle with the straight section of first porous belt assembly 28a. First scraper seal 20a may be made of any suitable material, including, but not limited to, hardened tool steel.

Second scraper seal 20b is formed and functions in the same manner as first scraper seal 20a to prevent stagnation at second porous belt assembly 28b.

First drive assembly 22a is positioned within the first interior section of first porous belt assembly 28a (porous tractor belts) and drives first porous belt assembly 28a in a first direction. First drive assembly 22a includes at least two drive sprockets, e.g., drive sprocket 38a and vacuum drive sprocket (porous) 39a, positioned at opposing ends of first porous belt assembly 28a. Each of drive sprocket 38a and vacuum drive sprocket (porous) 39a has a generally circular shaped base with a plurality of sprocket teeth protruding from the base. The sprockets interact with first porous belt assembly 28a and drives first porous belt assembly 28a around drive sprocket 38a and vacuum drive sprocket (porous) 39a. The vacuum drive sprocket (porous) 39a has a vacuum connection 42 for maintaining a negative pressure gradient across solids deaeration zone 45, e.g., across first porous belt assembly 28a. In an exemplary embodiment, first drive assembly 22a rotates first porous belt assembly 28a at a rate of between approximately 1 foot per second and approximately 5 feet per second (ft/s). The drive sprockets 38a and 39a include the required rotary vacuum seals and drive mechanisms known in the art that allow the drive assemblies to function.

Likewise, second drive assembly 22b includes at least two drive sprockets, e.g., drive sprocket 38b and vacuum drive sprocket (porous) 39b, positioned within the second interior section of second belt assembly 28b for driving second porous belt assembly 28b (porous tractor belts). Second drive assembly 22b is formed and functions in the same manner as first drive assembly 22a, except that second drive assembly 22b drives second porous belt assembly 28b in a second direction. The vacuum drive sprocket (porous) 39b has a vacuum connection 42 for maintaining a negative pressure gradient across solids deaeration zone 45, e.g., across second porous belt assembly 28b. The drive sprockets 38b and 39b include the required rotary vacuum seals and drive mechanisms known in the art that allow the drive assemblies to function.

In another embodiment, the solids deaeration zone can be configured similar to the porous roller assemblies described prior herein but replacing the porous roller assemblies with porous belt assemblies. For example, each porous belt assembly can comprise (i) at least one forward or lower roller and at least one rearward or upper roller disposed within the porous belt assembly, and (ii) at least one endless porous belt extending around the at least one forward or lower roller and the at least one rearward or upper roller defining at least one porous outer surface. A first porous belt assembly and a second porous belt assembly can be opposed to each other to form a solids passageway. The remainder of the solids deaeration zone and the solids pump zone can be as described for FIG. 1.

This disclosure involves providing solids to a solids source zone, e.g., reservoir, maintained at atmospheric pressure, passing the solids through a solids deaeration zone to deaerate the solids, and passing the solids to a solids pump zone, e.g., a variable speed, high pressure solids pump. The pump is used to pressurize the solids and convey the solids to an application or a pressurized dispenser vessel for further dispensing the solids to an application. The solids may be supplied to an application from the dispenser vessel by conveying the solids through a discharge line or other apparatus.

The solids source zone is in flow communication with the solids deaeration zone and includes at least one storage vessel or reservoir. The solids, e.g., pulverized dry coal, are conveyed by gravity from the solids source zone to the solids deaeration zone. The solids source zone, e.g., reservoir, may have fluidizing gas added to facilitate the dense phase flow of solids into the deaeration zone. Additional fluidizing gas may also be provided to the outlet of the solids source zone, in order to maintain the dense phase flow through the discharge outlet and assist in regulating the discharge flow to the solids deaeration zone. The solids source zone, e.g., reservoir, may also include pneumatic assistance to facilitate the dense phase flow of solids into the deaeration zone.

Valves, e.g., isolation valves, may be added at one or more points between the solids source zone, e.g., reservoir, and solids deaeration zone to assist in isolating parts of the system for cleaning and maintenance purposes. Further, vents may be provided in the solids source zone for helping to regulate the solids flow out of the reservoir.

The storage reservoir is typically maintained at atmospheric or near atmospheric pressure. The storage reservoir may be inerted (such as with nitrogen or $N_2$) from a source of inerting gas or remain un-inerted, depending on the combustibility of the fine solids therein. A reservoir outlet connects to the solids deaeration zone.

The collection and storage reservoir is supplied with solids, such as pulverized coal, from solids source. The reservoir has fluidizing gas provided to fluidize the solids within the reservoir to maintain a dense phase flow through outlet and into the solids deaeration zone. The reservoir may have one or more vent inlets near its top. The reservoir may be filled from solids source by any known methods, including but not limited to gravity, a belt type feeder, or a rotary feed pump, and the like.

The solids source zone can have a single reservoir that receives solids in the form of pulverized coal. The coal source can include reclaimed pulverized coal from sources such as baghouse filters and cyclones. The coal source can also include a primary source of pulverized coal such as from a pulverizer or crusher.

Figure 4:
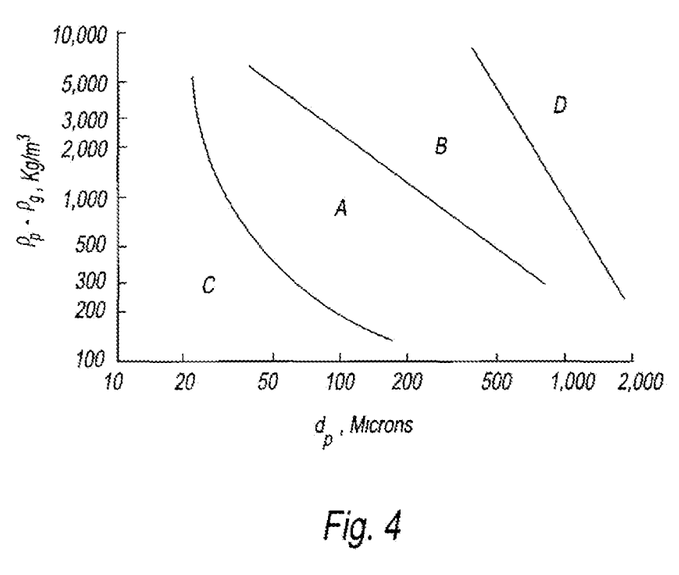
FIG. 4 is a graphical representation of Geldart's powder classification.

FIG. 4 is a graphical representation of Geldart's powder classification. See, for example, Geldart, D, *Powder Technology*, 7, 285-292 (1973). Referring to FIG. 4, the designation "A" includes aeratable material ($U_{mb}$>$U_{mf}$) having a significant deaeration time such as pulverized dry coal, FCC catalysts, and the like. The designation "B" includes materials that bubble above $U_{mf}$ ($U_{mb}$=$U_{mf}$) such as 500 micron sand, and the like. The designation "C" includes cohesive materials such as flour, fly ash, and the like. The designation "D" includes spoutable materials such as wheat, 2000 micron polyethylene pellets, and the like. The graph applies at ambient conditions. The solids useful in this disclosure typically fall within the areas designated "A" and "C" in FIG. 4 and are therefore not subject to fluidized flow without additional aeration.

The solids source zone may be constructed separately from the solids deaeration zone, in which case, the solids source zone and the inlet duct to the solids deaeration zone can be connected by any appropriate means, such as welds, coupleable flanges, bolts connectors or the like. Alternatively, the solids source zone and the inlet duct to the solids deaeration zone may be formed as a unitary structure.

The solids deaeration zone is in flow communication with the solids source zone and the solids pump zone. The solids deaeration zone includes a roller system containing a plurality of porous roller assemblies, or a belt system containing a plurality of porous belt assemblies. The solids deaeration zone is operable to deaerate and convey the solids to the solids pump zone. Importantly, in the solids deaeration zone, the solids become sufficiently compacted prior to and upon entry into the solids pump zone to be effectively conveyed through the solids pump zone. The particulate material, e.g., pulverized dry coal, moving through the solids deaeration zone can be deaerated to very low levels, well below the fluidization threshold. The solids deaeration zone is capable of being pressure regulated and is preferably operated at the same pressure or a slightly lower pressure than the solids reservoir pressure. The solids deaeration zone is typically operated at a pressure of from about atmospheric to about 200 psi.

The deaeration zone is configured to convey fine particulate material to the inlet port of the solids pump zone and to deaerate the particulate material during conveyance. The deaerator vent gas may be vented to atmosphere and/or may be induced by an exhauster fan. Alternatively, gases from the deaerator can be passed back into the reservoir. The deaerator may employ devices to stimulate flow and prevent pluggage by applying vibration to the deaerator. It may also utilize a pneumatic, for applying a pneumatic pulse inside the deaerator jacket that will stimulate the material flow inside the deaerator. The solids are then conveyed to the solids pump zone, e.g., a variable speed high pressure solids pump at the pump inlet.

The particulate material gradually deaerates moving down through the solids deaeration zone with the aid of the plurality of porous roller assemblies or the plurality of porous belt assemblies. The particulate material achieves a certain degree of compaction adjacent to an inlet port to the solids pump zone and forms relatively strong stress transmitting particle contact bridges between the solids pump zone components adjacent the inlet port. As a consequence, the particulate material is effectively conveyed into the transport channel and driven by the motion of the solids pump without substantial slipping between the particulate material and the internal surfaces of the solids pump. The particulate material moving through the solids deaeration zone can be deaerated to very low levels, well below the fluidization threshold.

The ability of the particulate material to deaerate and to achieve a suitable degree of compaction within the solids deaeration zone is dependant in part on the density, bulk modulus, and the internal friction angle of the particulate material. The length and/or height of the solids deaeration zone, and the number of porous roller assemblies or porous belt assemblies needed to achieve a suitable compaction, is determined by the ability of the particulate material to deaerate and the time required to achieve such a suitable compaction. Different particulate materials will deaerate at different rates. Thus, the length of the solids deaeration zone and the number of porous roller assemblies or porous belt assemblies needed is designed so as to allow sufficient deaeration of the specific material(s) for which the solids deaeration zone is to convey.

The time required for deaeration of the particulate material is also affected by the friction between the particulate material and the internal wall(s) of the solids deaeration zone. The internal surface can be made of or coated with a low friction material (such as for example, polytetrafluoroethylene or other suitable ultra-high molecular weight materials) to reduce friction between the particulate material and the internal surface of the solids deaeration zone. In addition, the wall may be made of polished steel with a surface roughness (Ra) of about 15 to about 30 microinches or less.

As the particulate material moves down through the solids deaeration zone, the particulate material deaerates and compacts to a degree. As a result, the particulate material achieves a certain degree of deaeration and compaction adjacent the inlet port to the solids pump zone and forms relatively strong stress transmitting particle contact bridges between the solids pump zone components adjacent the inlet port. Accordingly, the suitably compacted particulate material is effectively gripped and moved between the solids pump zone components without substantial slippage between the particulate material and internal surfaces of the solids pump zone.

Advantages of this disclosure include, for example, removing any delay time required for deaeration and improving the consistency of the pump feed rate. The feed rate through the solids deaeration zone employing porous roller assemblies or porous belt assemblies can be set by controlling roller size/rotation rate or the belt size/moving rate. Other advantages of this disclosure include removing limitations on the allowable belt or roller speed in the pump, reducing pump size, and improving pump efficiency. The deaeration zone operates generally to remove air from the solids flow and control feedrate to the solids pump zone.

Deaeration can then be achieved by making the rollers and belts out of a porous material with a negative pressure drop established in the radial outward direction across the compaction rollers. These rollers and belts could be used to deaerate solids that would then exit the rollers and belts via mechanical removal or they could be used to impact some moderate amount of preconsolidating pressure prior to the material entering the solids pump zone. A porous belt type approach involves the particulate material entering a straight or converging section of belts, across which a negative pressure gradient is maintained outward from the belts into the transport zone. As with the porous roller configuration, the moving nature of the porous belt surfaces will insure that clogging will not occur, while the applied vacuum will insure that the material enters the pump in a form that is amendable to pumping. The use of belts would allow direct deposition of the deaerated material into the moving section of the belts.

The solids deaeration zone may be constructed separately from the solids pump zone, in which case, the solids deaeration zone and the inlet duct to the solids pump zone can be connected by any appropriate means, such as welds, coupleable flanges, bolts connectors or the like. Alternatively, the solids deaeration zone and the inlet duct to the solids pump zone may be formed as a unitary structure.

The solids pump zone is in flow communication with the solids deaeration zone. The solids pump zone includes a solids pump that is operable to convey the solids to an application, e.g., gasification process.

The solids pump, e.g., variable speed high pressure solids pump, useful herein can both meter the flow of solids into an application or to a dispenser vessel, and increase the pressure from atmospheric pressure. This system for supplying an application or for filling a high pressure dispenser vessel may be operated continuously and the speed of the pump may be controlled so that a nearly constant level of solids may be maintained. The pump will be capable of providing solids to an application or a dispenser vessel at least as rapidly as the solids are used or discharged for use. The solids pump can discharge directly into a high pressure conduit for fluidization and conveying to an application such as a gasification process.

Valves, e.g., isolation valves, may be added at one or more points between the solids pump zone and the application or dispenser vessel to assist in depressurizing and isolating parts of the system for cleaning and maintenance purposes. Further, vents may be provided on the dispenser vessel for assisting with the pressure adjustment of the vessel and helping to regulate the solids flow out of the dispenser vessel.

In an embodiment, additional solids pumps may be added in parallel with the first pump to supply the same application or dispenser vessel, or other applications or dispenser vessels. The different solids pumps, applications and dispenser vessels do not have to have the same capacity requirements and their fill levels may be maintained independently of each other.

Metered and pressurized solids leave the solids pump outlet at a higher pressure than in the reservoir, are conveyed to an application or a pressurized dispenser vessel. The solids pump can be controlled by a control system which can vary the speed of the electric motor driving the solids pump, based upon signals from the application or signals indicative of the weight of the dispenser vessel provided by load cells or level sensors. The control system can provide a control signal to the electric motor. Manual (via a human operator) or automatic control signals from other systems may also be provided to the control system, based upon process conditions, such as those occurring within a gasification process. System data signals can be provided to remote locations to apprise operators of operating conditions.

This disclosure includes an arrangement that contains two or more solids pumps in parallel between a single reservoir and a single application or pressurized dispenser vessel. This arrangement would allow for greater capacity or for redundancy in case of a pump failure. This disclosure also includes an arrangement that contains two or more solids pumps in series for cases where one solids pump cannot achieve the pressure rise required by the system. Solids pumps in series would be in a cascade scheme, each delivering fine solids at higher pressure to the next solids pump.

Illustrative dry coal extrusion pumps useful in this disclosure include, for example, belt (tractor) pumps, roller pumps and rotary pumps such as described in U.S. Pat. Nos. 7,387,197 B2, 5,497,873, 4,988,239, and 4,516,674, and U.S. Patent Application Publication Nos. 2006/0243583 A1 and 2009/0178336 A1, the disclosures of which are incorporated herein by reference in their entirety.

Illustrative belt (tractor) pumps useful in this disclosure are described, for example, in U.S. Pat. No. 7,387,197 B2. A preferred belt (tractor) pump includes a passageway defined by a first belt assembly and a second belt assembly, wherein each of the first belt assembly and the second belt assembly has an interior section and wherein the first belt assembly and the second belt assembly are opposed to each other; an inlet for introducing particulate material, e.g., pulverized dry coal, into the passageway; an outlet for expelling the particulate material from the passageway; a first load beam positioned within the interior section of the first belt assembly; a second load beam positioned within the interior section of the second belt assembly; a first scraper seal and a second scraper seal positioned proximate the passageway and the outlet; a first drive assembly positioned within the interior section of the first belt assembly for driving the first belt assembly; and a second drive assembly positioned within the interior section of the second belt assembly for driving the second belt assembly. In accordance with this disclosure, the particulate material enters the belt (tractor) pump inlet from the deaeration zone sufficiently compacted to form a transient solid or bridge composed of compacted particulate material that allows the belt (tractor) pump to develop head or pressure in the particulate material and effectively convey the particulate material through the belt (tractor) pump.

Illustrative roller pumps useful in this disclosure are described, for example, in U.S. Patent Application Publication No. 2006/0243583 A1. A preferred roller pump includes a pump having an inlet operable to receive a particulate material; a roller system operable to pressurize the particulate material, the roller system including: a first motive roller adjacent to the inlet, the first motive roller operable to pressurize the particulate material to a first pressure level; a second motive roller adjacent to the inlet and displaced a first distance across from the first motive roller, the second motive roller receiving the particulate material of the first pressure level and further pressurizing the particulate material to a second pressure level; and an outlet adjacent to the roller system, the outlet operable to dispense the particulate material at a high pressure to an application. In accordance with this disclosure, the particulate material enters the roller pump inlet from the deaeration zone sufficiently compacted to form a transient solid or bridge composed of compacted particulate material that allows the roller pump to develop head or pressure in the particulate material and effectively convey the particulate material through the roller pump.

Illustrative rotary pumps useful in this disclosure are described, for example, in U.S. Pat. Nos. 5,497,873, 4,988,239, 4,516,674, and U.S. Patent Publication No. 2009/0178336 A1. A preferred rotary pump includes a pump having a moveable wall structure defining a transport channel and having an inlet for receiving particulate material, e.g., pulverized dry coal, into the channel and an outlet for emitting particulate material from the channel, wherein the moveable wall structure defines at least one wall moveable in the direction from the inlet toward the outlet for imparting a force directed toward the outlet on the particulate material entering the channel from the inlet. In accordance with this disclosure, the particulate material enters the rotary pump inlet from the deaeration zone sufficiently compacted to form a transient solid or bridge composed of compacted particulate material that allows the rotary pump to develop head or pressure in the particulate material and effectively convey the particulate material through the rotary pump.

It will be appreciated that conventional equipment can be used to perform the various functions of the solids supply system, such as monitoring and automatically regulating the flow of solids so that it can be fully automated to run continuously in an efficient manner.

The solids supply system described herein can be controlled by a control system. The control system may control operations of the solids source zone, solids deaeration zone, and solids pump zone. Illustrative operations include controlling particulate material flow rate throughout the solids supply system, speed of the porous rollers and porous belts in the solids deaeration zone, speed of the pump motor in the solids pump zone, and the like. For example, in the solids pump zone, one or more solids pumps can be controlled by a control system which can vary the speed of the electric motor driving each solids pump, based upon signals from an application, for example, signals indicative of the weight of a dispenser vessel provided by load cells or level sensors. The control system can provide a control signal to each of the electric motors. Manual (via a human operator) or automatic control signals from other systems may also be provided to the control system, based upon process conditions, such as those occurring within gasification processes. System data signals can again be provided to remote locations to provide system status information to the operators.

Various modifications and variations of this disclosure will be obvious to a worker skilled in the art and it is to be understood that such modifications and variations are to be included within the purview of this application and the spirit and scope of the claims.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A solids supply system comprising:
   (i) a solids deaeration zone, and
   (ii) a solids pump zone;
   wherein said solids deaeration zone is in flow communication with said solids pump zone; said solids deaeration zone comprises: (a) a roller system comprising a plurality of porous roller assemblies, or (b) a belt system comprising a plurality of porous belt assemblies, operable to deaerate and convey the solids to said solids pump zone, wherein said solids become sufficiently compacted prior to and upon entry into said solids pump zone to be effectively conveyed through said solids pump zone;
   wherein the solids pump zone is comprised of a belt (tractor) pump, and the tangential velocity of the solids at the porous roller assemblies or porous belt assemblies in the solids deaeration zone is from 80% to 120% of the tangential velocity of the solids at the belt assemblies of the solids pump zone;
   wherein said solids deaeration zone is capable of being pressure regulated; and
   wherein said belt (tractor) pump is operable to convry said to an application.

2. The solids supply system of claim 1, wherein said solids become sufficiently compacted prior to and upon entry into said solids pump zone to form a transient solid or bridge composed of compacted particulate material that allows the solids pump to develop head or pressure in the particulate material and effectively convey the particulate material through the solids pump.

3. The solids supply system of claim 1, wherein said plurality of porous roller assemblies comprise: a first porous roller assembly, and a second porous roller assembly, wherein the first porous roller assembly and the second porous roller assembly are opposed to each other to form a solids passageway.

4. The solids supply system of claim 1, wherein said plurality of porous belt assemblies comprise: a first porous belt assembly and a second porous belt assembly, wherein the first porous belt assembly and the second porous belt assembly are opposed to each other to form a solids passageway.

5. The solids supply system of claim 1, wherein the solids comprise a Geldart classification type "A" or "C" material.

6. The solids supply system of claim 5, wherein the solids comprise a pulverized dry coal.

7. The solids supply system of claim 1, wherein the application comprises a gasification process.

8. The solids supply system of claim 1, further comprising multiple solids source zones in parallel and/or multiple solids pump zones in parallel.

9. The solids supply system of claim 1, wherein said solids deaeration zone is integrated with said solids pump zone.

10. The solids supply system of claim 1, wherein a solids source zone is fluidly connected to the inlet of the solids deaeration zone, and the solids deaeration zone is at a lower pressure than the solids source zone.

11. The solids supply system of claim 1, wherein the solids pump zone is comprised of an inlet and an outlet and the differential pressure between the solids pump zone outlet and solids pump zone inlet is from 200 to 2,000 psig.

12. The solids supply system of claim 1, which is controlled by a control system.

13. A method for transporting solids comprising:
(i) providing a solids deaeration zone and a solids pump zone, wherein said solids deaeration zone is in flow communication with said solids pump zone, said solids deaeration zone comprises (a) a roller system comprising a plurality of porous roller assemblies, or (b) a belt system comprising a plurality of porous belt assemblies, operable to deaerate and convey the solids to said solids pump zone, said solids deaeration zone is capable of being pressure regulated, and said solids pump zone comprises a solids pump operable to transport said solids,
wherein the solids pump zone is comprised of a belt (tractor) pump, and the tangential velocity of the solids at the porous roller assemblies or porous belt assemblies in the solids deaeration zone is from 80% to 120% of the tangential velocity of the solids at the belt assemblies of the solids pump zone;
(ii) deaerating the solids in the solids deaeration zone, wherein said solids become sufficiently compacted prior to and upon entry into said solids pump zone to be effectively conveyed through said solids pump zone; and
(iii) pumping the solids in the solids pump zone to an application.

14. The method of claim 13, wherein said solids become sufficiently compacted prior to and upon entry into said solids pump zone to form a transient solid or bridge composed of compacted particulate material that allows the solids pump to develop head or pressure in the particulate material and effectively convey the particulate material through the solids pump.

15. The method of claim 13, wherein said plurality of porous roller assemblies comprise a first porous roller assembly and a second porous roller assembly, wherein the first porous roller assembly and the second porous roller assembly are opposed to each other to form a solids passageway.

16. The method of claim 13, wherein said plurality of porous belt assemblies comprise: a first porous belt assembly and a second porous belt assembly, wherein the first porous belt assembly and the second porous belt assembly are opposed to each other to form a solids passageway.

17. The method of claim 13, wherein the solids comprise a Geldart classification type "A" or "C" material.

18. The method of claim 17, wherein the solids comprise a pulverized dry coal.

19. The method of claim 13, wherein the application comprises a gasification process.

20. The method of claim 13, wherein the solids deaeration zone is fluidly connected to a negative pressure zone, wherein the pressure in the negative pressure zone is lower than the pressure in the solids deaeration zone.

21. The method of claim 13, wherein a solids source zone is fluidly connected to the inlet of the solids deaeration zone, and the solids deaeration zone is at a lower pressure than the solids source zone.

22. The method of claim 13, further comprising multiple solids source zones in parallel and/or multiple solids pump zones in parallel.

23. A solids supply system comprising:
(i) a solids deaeration zone, the solids deaeration zone comprising an inlet duct and opposing walls; and
(ii) a solids pump zone, said solids deaeration zone being integrated with said solids pump zone;
wherein said solids deaeration zone is integrated with said solids pump zone; said solids deaeration zone and said solids pump zone comprising a belt system comprising a plurality of porous belt assemblies, each porous belt assembly including a porous drive sprocket operating in both said solids deaeration zone and said solids pump zone, each porous belt assembly having a radius at the porous drive sprocket, the belt system being operable to deaerate the solids, wherein said solids become sufficiently compacted prior to and upon entry into said solids pump zone to be effectively conveyed through said solids pump zone;
wherein a distance between an outside wall of the inlet duct and an opposing wall is from about 0.2 times to about 1.2 times the radius of a porous belt assembly at the porous drive sprocket;
wherein said solids deaeration zone is capable of being pressure regulated; and
wherein said belt (tractor) pump is operable to convey said to an application.

24. The solids supply system of claim 23, wherein a solids source zone is fluidly connected to the inlet of the solids deaeration zone, and the solids deaeration zone is at a lower pressure than the solids source zone.

25. The solids supply system of claim 23, wherein the solids pump zone is comprised of an inlet and an outlet and the differential pressure between the solids pump zone outlet and solids pump zone inlet is from 200 to 2,000 psig.

* * * * *